H. P. KRAFT.
TIRE VALVE OR THE LIKE.
APPLICATION FILED JUNE 15, 1916.

1,432,869.

Patented Oct. 24, 1922.

WITNESSES:
René Bruine
J. L. Wallace

INVENTOR
Henry P. Kraft
By Attorneys,
Fraser, Trask & Myers

Patented Oct. 24, 1922.

1,432,869

UNITED STATES PATENT OFFICE.

HENRY P. KRAFT, OF RIDGEWOOD, NEW JERSEY.

TIRE VALVE OR THE LIKE.

Application filed June 15, 1916. Serial No. 103,850.

*To all whom it may concern:*

Be it known that I, HENRY P. KRAFT, a citizen of the United States of America, residing in Ridgewood, in the county of Bergen and State of New Jersey, have invented certain new and useful Improvements in Tire Valves or the like, of which the following is a specification.

This invention relates to valves for pneumatic tires or the like, and aims to provide certain improvements therein.

It has heretofore been proposed to construct a valve of this character with its casing or shell in two parts, the body portion usually being formed of steel or iron, and the top portion being in the form of an insert of brass or other rust resisting material and including the nipple, and preferably also the portion within which the valve parts work, the two portions of the valve being permanently connected with a leak-tight joint by forcing the insert into a bore in the body portion. Such valve casings are very economical to construct because of the use of cheaper metal for the main portion of the casing, and are efficient for the reason that the portion of the casing which is most affected by rust is formed of rust proof material. The present invention relates to a method of connecting the two parts which facilitates the manufacturing operations.

According to this invention the bore in the body portion of the casing is preferably formed with a slight taper, the interior wall of the bore being provided with ridges, and the insert is formed with a similar contour but its external wall is smooth. I have found in practice that when so constructed the insert may be pushed into position with comparatively little force and when once in place a joint is formed which is mechanically strong and perfectly leak tight. This I effect by merely forcing the tapered insert into close contact with the ridged tapered bore and without upsetting or expanding the mass of the metal of the insert. In this respect my invention is clearly differentiated from those in which an insert is compressed between its ends, and thereby upset or expanded, to cause parts of the material to flow into and fill the spaces between ridges in the bore of a part within which the insert is to be secured.

In the accompanying drawings wherein I have illustrated one form of the invention,—

Figure 1:
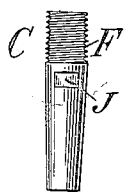
Figure 1 is an elevation of the insert.
Figure 2:
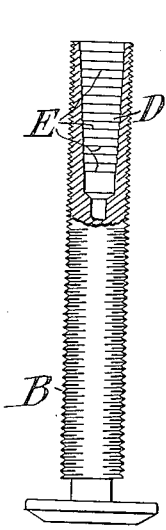
Fig. 2 is an elevation partly in section of the body portion.
Figure 3:
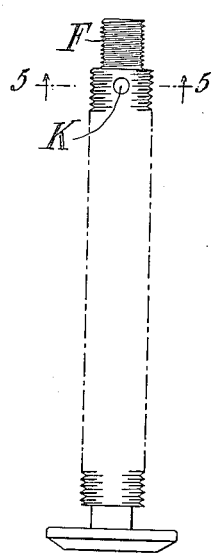
Fig. 3 is an elevation of the valve shell complete.
Figure 4:
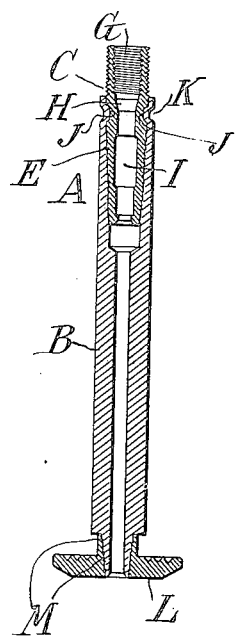
Fig. 4 is a diametrical section of Fig. 3.
Figure 5:
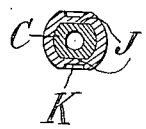
Fig. 5 is a section on the line 5—5 of Fig. 3.
Figure 6:
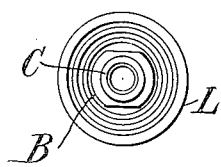
Fig. 6 is a plan view of the valve.
Figure 7:
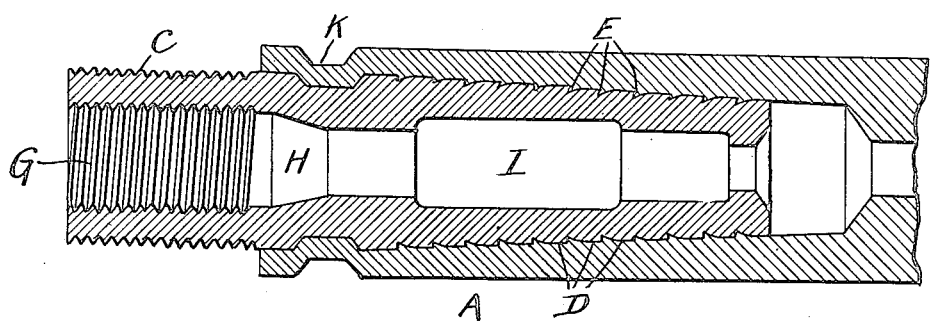
Fig. 7 is a sectional view, drawn to a larger scale, of the upper portion of the valve shell shown in section in Fig. 4.

Referring to the drawings let A indicate the valve as a whole which is shown as formed with a body portion B and an insert C. The body portion B for cheapness is preferably constructed of iron or steel and forms the greatest portion of the valve casing. Near its top the body portion is formed with a bore D which is preferably slightly tapered and is provided with a series of ridges E, best shown in exaggerated proportions in the enlarged view, Fig. 7, which may be ten or more in number, such ridges providing in effect rings of cutting edges. The insert C is best formed of brass or other rust resisting material and is constructed with a tapered outer wall of unridged or smooth construction, the size of such wall being preferably such that under normal conditions the insert will extend from an eighth to a quarter of an inch above the position which it is to finally occupy in the completed casing.

The parts are united by pressing the insert into the bore D by a suitable press or other device, and in the act of pressing the ridges E apparently cut slightly into the tapered wall of the insert with the effect that a leak tight joint is secured. At the same time the pressure required for forcing the insert into position is comparatively slight. In this respect my invention differs from devices of the prior art in which the insert is upset or swaged by the application of sufficient end-wise pressure to cause the mass of material to be expanded and thus caused to flow into and fill the recesses between ridges of the bore.

I prefer to form the insert complete with its outer nipple thread F, inner nipple thread G, seat H, valve chamber I, etc., fully formed before inserting it in position. By reason of the slight pressure required according to the method herein described, I am enabled to force the insert into its position even though fully preformed without danger of distortion of the threads, seat, etc. I may also plate the insert with a coating of nickle, tin, lead or other finishing material prior to its connection with the body of the casing. This is important in actual manufacture since the inserts may be completely formed in small machines and properly finished for use prior to the actual assembly of two parts. If it is desired to sherardize the body of the casing or give it a protecting coating of some other kind this may also be done prior to assembly.

In the construction of valves with automatic machinery on a commercial scale the diameters of the insert and bore will vary somewhat from time to time, with the result that when the parts are brought together before the pressing operation the insert may extend somewhat above normal in some cases and below in other cases. In practicing the invention I prefer to form the diameters so that with the largest bore due to slight variations in tools, etc., and the smallest insert, there will be ample room for the insert to be pressed into leak tight position. When the reverse condition is encountered there will be of course abundant room to permit the necessary inward movement of the insert.

It is desirable to obtain the connection of the parts with as little pressure as possible, and I hence prefer to apply a given pressure in the operation of assembling, which pressure is sufficient to force the insert into its bore to an extent far enough to insure a leak tight joint. Hence I prefer to use a press in which only a given pressure can be exerted. Where the insert is large and the bore is small this may leave the insert extending slightly beyond a normal or standard position, but this is immaterial in use.

In order to guard against any possibility of the insert being forced out under pressure, I prefer to form a slot or slots J in the sides of the insert at such point that they will assume a position below the end of the body B and indent the body as shown at K preferably in the flat portions of the body. This not only prevents any possibility of blowing out of the inserts under high pressure but also avoids the possibility of the insert rotating within the casing when a pump coupling or valve cap is applied to the nipple.

I may also attach the foot L of the valve to the body portion B by a similar method. If the foot L is of brass or of other metal which is softer than the body portion the ridges are made upon the body of the shell as indicated at M. In the construction shown the body of the shell is formed with a projecting portion N which enters into a bore in the brass foot and the ridges are hence external. If desired the parts may be reversed.

While I have shown and described one form of the invention it will be understood that I do not wish to be limited thereto since various changes can be made therein without departing from the spirit of the invention.

What I claim is:—

1. A tire valve casing comprising two parts, one of which is provided with a bore and the other of which is adapted to enter said bore, and one part being provided with ridges and the other part having a substantially smooth contacting wall, and said parts being united by pressure without upsetting the metal.

2. A tire valve casing comprising two parts, one of which is of relatively hard metal and the other of which is of relatively soft metal, and one of which is formed with a bore and the other being adapted to enter said bore, the harder of said parts having a series of ridges and the softer of said parts having a substantially smooth contacting wall, and said parts being united by pressure without upsetting the metal.

3. A tire valve casing comprising a body portion of oxidizing metal, and an insert of rust resisting metal, the insert including the nipple of the valve, the body portion having a bore formed with ridges and the insert having a substantially smooth wall for contacting therewith, and said parts being united by pressure without upsetting the metal.

4. A tire valve casing comprising a body portion of oxidizing metal, and an insert of rust resisting metal, the insert including the nipple of the valve, the body portion having a tapered bore and the insert having a substantially smooth tapered wall and the insert being unswaged.

5. A tire valve casing having a body portion and a foot portion, one of said parts being formed with a series of ridges and the other of said parts being formed of a substantially smooth contacting wall, and one of said parts entering the other part and the ridges cutting into such wall.

6. A tire valve casing comprising a body portion formed of relatively hard metal, and a foot portion formed of relatively soft metal, the harder part having a series of ridges and the softer part having a substantially smooth contacting wall, and one of said parts entering the other and being united thereto by pressure without upsetting the metal.

7. The method of forming a tire valve casing, consisting in constructing one part of hard metal with a bore provided with a series of ridges, and another part adapted to enter said bore and formed of softer metal and having a smooth contacting wall, both of said parts being correspondingly tapered, and joining them by forcing the one within the other until the ridges of the hard metal part engage the smooth surface of the softer metal and retain the latter.

8. A tire valve casing comprising two parts, one of which is provided with a bore and the other of which is adapted to enter said bore, and one part being provided with ridges and the other part having a substantially smooth contacting wall, the bore being longer than the portion of the entering part within the bore, and the parts being united by pressure without upsetting the metal.

In witness whereof, I have hereunto signed my name.

HENRY P. KRAFT.